Figure 1:
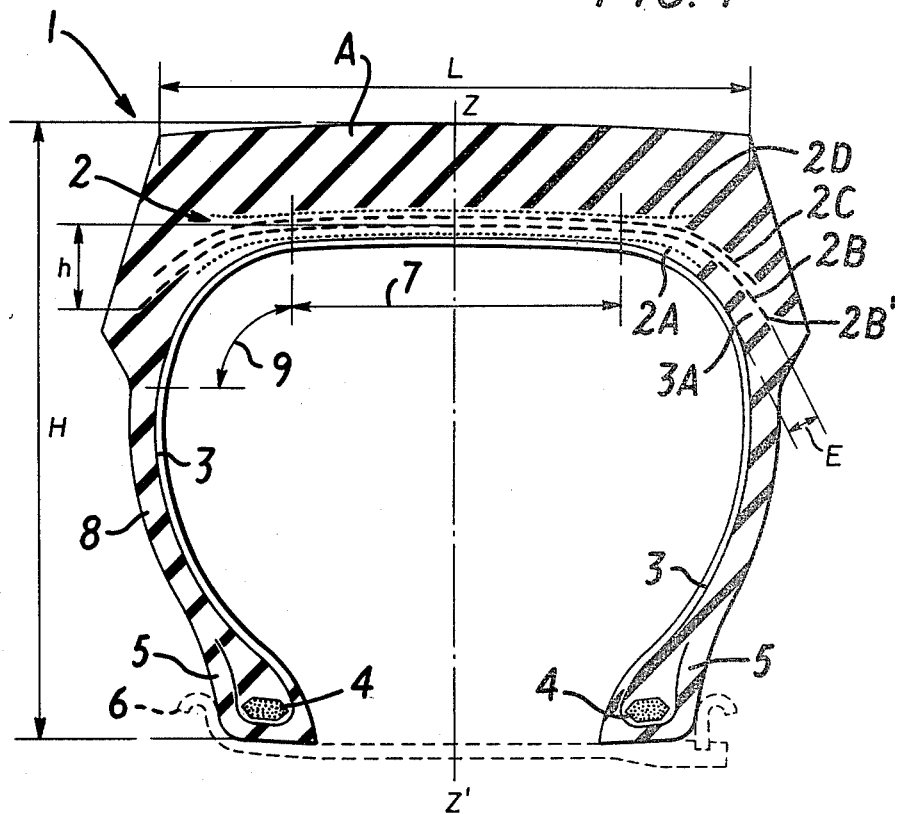

United States Patent [19]

Pommier

[11] 4,234,031
[45] Nov. 18, 1980

[54] RADIAL TIRE WITH HIGH ANGLE, LOW ELONGATION PLIES AND LOW ANGLE, HIGH ELONGATION PLIES IN BELT

[75] Inventor: Jean Pommier, Clermont-Ferrand, France

[73] Assignee: Compagnie Generale des Etablissements Michelin, Clermont-Ferrand, France

[21] Appl. No.: 40,204

[22] Filed: May 18, 1979

[30] Foreign Application Priority Data

May 24, 1978 [FR] France ........................ 78 15673

[51] Int. Cl.³ .................... B60C 9/20; B60C 9/08
[52] U.S. Cl. ..................... 152/356 R; 152/359; 152/361 R; 152/361 DM
[58] Field of Search ............ 152/354 R, 354 RB, 355, 152/356 R, 356 A, 361 R, 361 DM, 361 FP, 359

[56] References Cited

U.S. PATENT DOCUMENTS

| | | | |
|---|---|---|---|
| 2,493,614 | 1/1950 | Bourdon | 152/357 X |
| 3,090,189 | 5/1963 | Boussu et al. | 57/311 |
| 3,543,828 | 12/1970 | Caille et al. | 152/361 R |
| 3,581,794 | 6/1971 | Heuze et al. | 152/361 |
| 3,625,271 | 12/1971 | Hutch | 152/354 |
| 3,667,527 | 6/1972 | Magistrini et al. | 152/361 R X |
| 4,161,203 | 7/1979 | Suzuki et al. | 152/361 DM |
| 4,172,487 | 10/1979 | Suzuki et al. | 152/361 DM |

Primary Examiner—John T. Goolkasian
Assistant Examiner—Lois E. Rodgers
Attorney, Agent, or Firm—Brumbaugh, Graves, Donohue & Raymond

[57] ABSTRACT

A tire with a radial carcass reinforcement and a tread reinforcement formed of at least three plies of cables is improved due to the fact that the tread reinforcement is formed of two plies of cables having a very low elongation and forming angles of 50°–70° with the longitudinal direction of the tire and of two plies of elastic cables forming angles of 5°–15° with the longitudinal direction of the tire.

13 Claims, 4 Drawing Figures

RADIAL TIRE WITH HIGH ANGLE, LOW ELONGATION PLIES AND LOW ANGLE, HIGH ELONGATION PLIES IN BELT

This invention relates to tires having a tread, a carcass reinforcement formed of at least one ply of radial wires or cables anchored to at least one bead ring in each bead and a tread reinforcement arranged radially on the outside of the carcass reinforcement and formed of at least three superimposed plies of wires or cables parallel in each ply and crossed from one ply to the next, forming different angles of less than 90° with the longitudinal direction of the tire.

Such a tread reinforcement employing metal cables is described in U.S. Pat. No. 2,493,614. It can be formed of a ply of cords which form an angle ranging between 8° and 20° with the longitudinal direction of the tire, and of two plies of cord which form with the same direction angles ranging between 60° and 75°. Due to its very high rigidity, this tread reinforcement has an axial width less than the axial width of the tread. In order to decrease the wear of the edges of the tread it has been proposed (U.S. Pat. No. 3,518,794) to widen such a tread reinforcement by extending it into the shoulders of the tire. The life of tires according to this solution leaves much to be desired.

On the other hand, it appears advantageous, particularly in order to improve the life of the tire and its behavior with respect to the road and obstacles, to decrease the meridian curvature of the tread by providing the carcass reinforcement with an equatorial zone which is as wide as possible and of very low meridian curvature, preferably less than its circumferential curvature at the equator, which makes it possible to decrease the meridian curvature of the sidewalls and their sensitivity to cuts. On the other hand, this makes it necessary to provide, between the equatorial zone and the sidewalls, transition zones in which the meridian curvature of the carcass reinforcement is not only maximum but reaches very high values.

The widening of the quasi-cylindrical zone of the tread results in a certain number of drawbacks. The carcass reinforcement, when subjected to the inflation pressure, tends towards its natural equilibrium profile. It thus subjects the tread reinforcement to a considerable tensile stress, particularly the work plies of the tread reinforcement. The high meridian curvature of the transition zones in the tire when the latter is mounted and inflated is amplified by the static and dynamic crushing due to the load and irregularities of the ground. This results in an increase in the stresses both at the transition zones of the carcass reinforcement and the marginal zones of the tread reinforcement, as well as an increase in sensitivity of the transition zones to cuts and punctures, particularly in the case of tires for heavy and very heavy carrier vehicles which travel off the road.

The object of the invention is to overcome the drawbacks resulting from the decrease of the meridian curvature in the equatorial zone and the increase of the meridian curvature in the transition zones or shoulders of the carcass reinforcement.

Thus, the tires of the type in question are characterized, in accordance with the invention, by the fact that the tread reinforcement is formed, on the one hand, of two superimposed plies of wires or cables of very low elongation, which are parallel in each ply and crossed from one ply to the next forming angles of between 50° and 70° with the longitudinal direction of the tire and, on the other hand, of at least one ply of elastic wires or cables which are parallel to each other in said ply and forming an angle of between 5° and 15° with the longitudinal direction of the tire, said ply having an axial width less than that of the tread, at least one of the two plies of wires or cables of very low elongation being arranged radially to the inside of said ply of elastic wires or cables.

The axial width of the tread is equal to the axial width of the surface of the tread in contact with the ground, when the new tire is under load, mounted and inflated in accordance with the customary standards.

There are defined as wires or cables of very low elongation wires or cables, preferably of steel, whose relative elongation $\Delta l/l$ is less than 0.2% measured at 10% of their rupture force. In the event of the use of cables of steel wires, the cable lay is preferably more than 12 times the apparent diameter of the cables.

The wires or cables considered as elastic have a relative elongation $\Delta l/l$ which is greater than 0.5% measured at 10% of their rupture force. In the case of the use of cables of steel wires, such wires will preferably be in accord with the specifications of U.S. Pat. No. 3,090,189.

The wires or cables of the carcass reinforcement and of the tread reinforcement are, as customary, surrounded by a thin layer of rubber in order to form plies.

Preferably, at least one of the two crossed plies of wires or cables of very low elongation has an axial width greater than the axial width of the tread, so as to protrude slightly laterally into the sidewalls. Preferably also, this ply is the one which is closest to the carcass reinforcement. Thus, said ply may extend up to a radial distance h of less than 0.4 H in the case of tires having an H/B ratio at least equal to 0.65, H being the radial height of the unloaded tire mounted and inflated in accordance with the customary standards, and B being the maximum axial width of the tire as measured from one sidewall to the other. The said radial extension h is measured from the intersection of the carcass reinforcement with the equatorial plane in the direction towards the axis of rotation of the tire.

The two plies of wires or cables of very low elongation are advantageously associated with two plies of elastic wires or cables crossed with respect to each other, the two plies of wires or cables of very low elongation being arranged radially either on the inside of the two plies of crossed elastic wires or cables or between the two plies of elastic wires or cables which are crossed with respect to each other.

The first variant, namely radially on the inside, is preferable, particularly in tires intended to travel on rough ground or over obstacles, for instance off the road. The fact that the plies of wires or cables of very low elongation are close to the carcass reinforcement decreases the stresses of the latter, particularly in the strongly convex areas of transition or connection. It is also preferable, in case of the use of a single ply of elastic wires or cables, to arrange such ply radially outward of the two plies of wires or cables of very low elongation.

Preferably, the tread reinforcement in accordance with the invention is parallel to the carcass reinforcement along an equatorial zone whose axial width is a function of the shape of the tire. In one advantageous arrangement, the tread reinforcement touches the carcass reinforcement along said equatorial zone and, axially outward thereof, is separated from the carcass reinforcement by a layer of rubber whose thickness increases in direction away from the equatorial zone up to a value which may reach 50% of the total thickness of the wall of the tire at the ends of the tread reinforcement. Such an arrangement, on the one hand, assures the protection of the strongly curved regions of transition or connection of the carcass reinforcement from cutting or perforating objects. On the other hand, due to the small inclination of the two plies of wires or cables of very low elongation with respect to the radial wires or cables of the carcass reinforcement, the latter easily tends towards its natural meridian equilibrium profile.

Another advantageous arrangement consists in interposing strips of rubber between the edges of the plies of the tread reinforcement in accordance with the invention and/or imparting to said plies slightly different axial widths.

It is surprising to note that, despite the reversing of the characteristics of the tread plies and the use of elastic cables which is customarily recommended for protection plies but not reinforcement plies, the radial tires in accordance with the invention have a coefficient of resistance to drift at least equal to that of radial tires of the same dimensions having a conventional tread reinforcement.

The balance of the present specification refers to the drawing which illustrates, by way of example, two variant embodiments of the invention.

Figure 2:
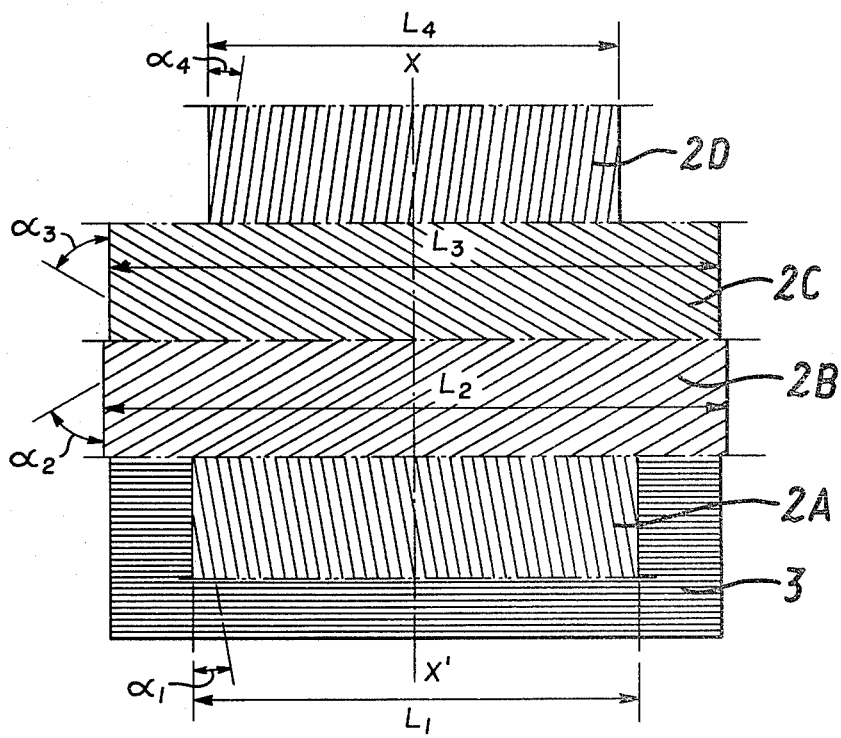
Figure 3:
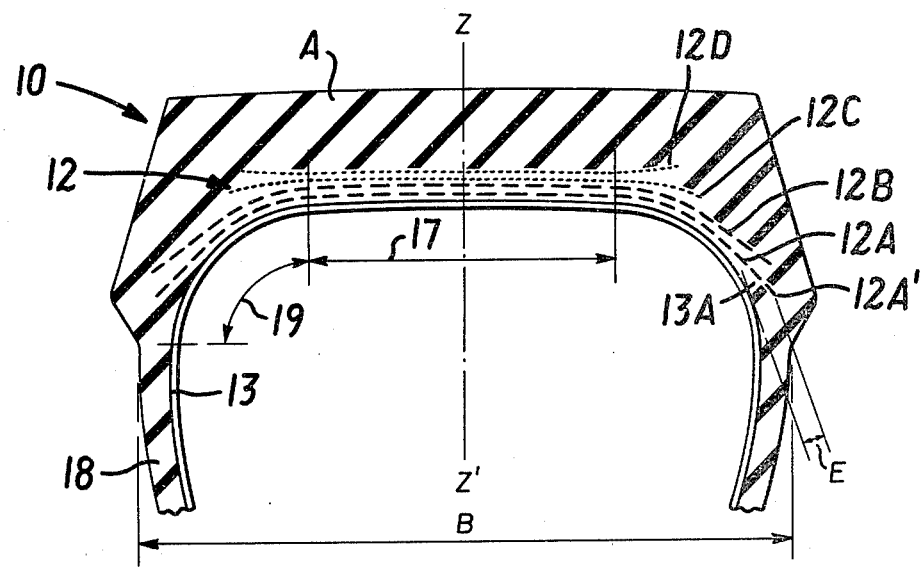
Figure 4:
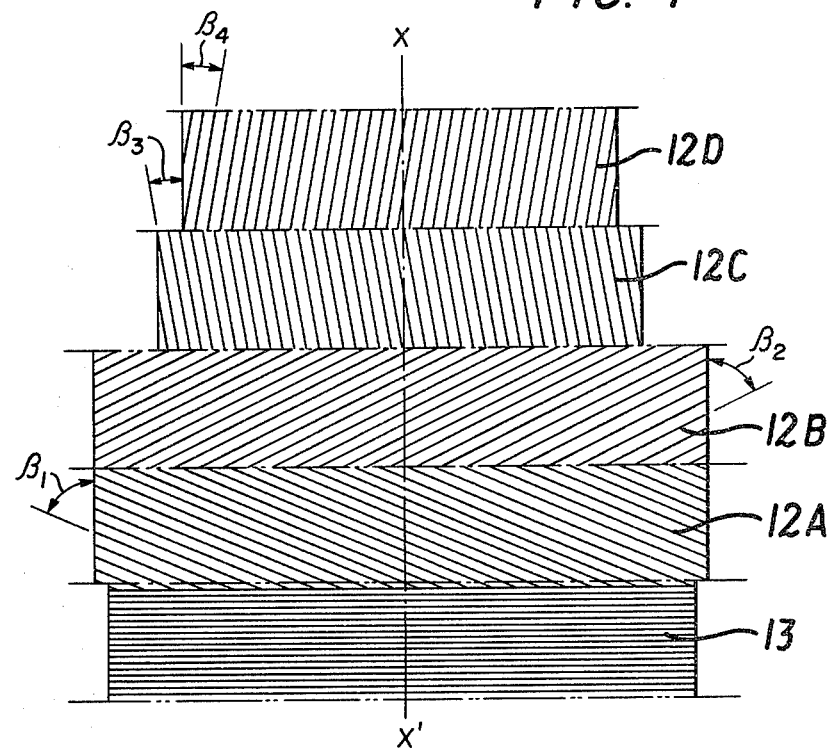

The drawing shows two meridian cross sections of the tires 1 (FIG. 1) and 10 (FIG. 3) in accordance with the invention, as well as corresponding partial top plan views, broken away, of tread reinforcements 2 (FIG. 2) and 12 (FIG. 4).

The tire 1 of FIG. 1 comprises a tread reinforcement 2 arranged radially outward of the carcass reinforcement 3 formed of a single ply of radial steel cables. This ply is folded back around the bead ring 4 in the bead 5. The tread reinforcement 2 is formed of four plies 2A, 2B, 2C and 2D of wires or cables which are parallel in each ply (FIG. 2) but crossed from one ply to the next. The plies 2B and 2C are arranged between the two plies 2A and 2D. In accordance with the invention, the two crossed plies 2B and 2C are reinforced with steel cables of very low elongation ($\Delta l/l < 0.2\%$) forming angles $\alpha_2$ and $\alpha_3$ which are preferably between 55° and 60° with the longitudinal direction XX' of the tire indicated by the linear trace of the equatorial plane on the plane of FIG. 2, the trace of the equatorial plane on the plane of FIG. 1 being the straight line ZZ'. H is the height of the tire on the rim 6, as defined above. The plies 2B and 2C of cables of very low elongation have axial widths $L_2$ and $L_3$ which are greater than the axial width L of the tread A and decrease radially towards the outside of the tire. Thus, the ply 2B extends over a radial distance h close to 0.17 H. The plies 2A and 2D of elastic steel cables ($\Delta l/l < 0.5\%$) are arranged in the manner that one, 2A, is in contact with the carcass reinforcement 3 while the other, 2D, is radially outward of the two crossed plies 2B and 2C of cables of very low elongation. The plies 2A and 2D are crossed with respect to each other, forming angles $\alpha_1$ and $\alpha_4$ of preferably between 8° and 12° with the longitudinal direction XX'. Their axial widths $L_1$ and $L_4$ also decrease in direction radially towards the outside but are less than the axial width L of the tread A. Preferably, the axial widths $L_1$ and $L_4$ are between 60% and 80% of the axial width L.

The tire 10 of FIG. 3 differs from the tire 1 of FIG. 1 by the tread reinforcement 12. The latter has two plies 12A and 12B of steel cables of very low elongation, arranged radially to the inside of the two plies 12C and 12D of elastic steel cables. The crossed plies 12A and 12B form angles $\beta_1$, $\beta_2$ close to 58.5° with the longitudinal direction XX' of the tire while the crossed plies 12C and 12D form angles $\beta_3$, $\beta_4$ close to 10° with said same direction. The ply 12A touches the carcass reinforcement 13 along an equatorial zone 17 having a width close to 0.52 times the axial width L of the tread A. The maximum axial width of this tire 10 is designated by the dimension B.

As can be seen from FIGS. 1 and 3, the carcass reinforcement 3 (13) of the tire according to the invention has an equatorial zone 7 (17) along which it is quasicylindrical.

Axially outward of the equatorial zone 7 (17) and between the sidewall 8 (18) of small meridian curvature and the equatorial zone 7 (17) there is located an transition or connecting zone 9 (19) of the carcass reinforcement 3 (13) where said carcass reinforcement reaches its maximum meridian curvature, which is very large as compared with the meridian curvatures of the sidewall 8 (18) and of the equatorial zone 7 (17). This very large meridian curvature has a maximum, located between the sidewall 8 (18) and the said equatorial zone 7 (17), which is between 6 and 20 times the circumferential curvature of the equatorial zone 7 (17) at the equator, that is to say at the intersection of the trace ZZ' of the equatorial plane with the carcass reinforcement 3 (13).

From FIGS. 1 and 3 it is also seen that the plies 2B and 12A of steel cables of very low elongation which are closest to the carcass reinforcement 3 (13) are separated in each case from the latter by a layer of rubber 3A (13A) of a thickness E such as defined above with respect to the total thickness of the wall of the tire measured in the region of the end 2B' (12A') of this ply. Moreover, the plies 2A, 2B, 2C, 2D and 12A, 12B, 12C, 12D, respectively, are arranged in fan-wise fashion, that is to say their edges are spaced from each other by the interposition of strips of rubber of wedge-shaped cross section whose thickness increases with the distance from the equatorial plane of trace ZZ'.

What is claimed is:

1. A tire, particularly for heavy and very heavy carrier vehicles traveling off the road, having a tread, a carcass reinforcement formed of at least one ply of radial wires or cables anchored to at least one bead ring in each bead and a tread reinforcement arranged radially outward of the carcass reinforcement and formed of at least three superimposed plies of wires or cables parallel in each ply and crossed from one ply to the next forming different angles less than 90° with the longitudinal direction of the tire, the carcass reinforcement having an equatorial zone of low meridian curvature connnected on both sides to the sidewalls by a transition zone of high meridian curvature, characterized by the fact that the tread reinforcement is formed of
(a) at least one ply of elastic wires or cables which are parallel to each other in said ply and form an angle of between 5° and 15° with the longitudinal direction of the tire, said ply having an axial width less than that of the tread, and
(b) two superimposed plies of wires or cables of very low elongation which are parallel to each other in each ply and crossed from one ply to the next forming angles of between 50° and 70° with the longitudinal direction of the tire; that ply of wires or cables of very low elongation which is closest to the carcass reinforcement has an axial width greater than the axial width of the tread and extends into said transition zone and is separated from the carcass reinforcement in said transition zone by a layer of rubber whose thickness increases axially in the direction away from said equatorial zone.

2. The tire according to claim 1, characterized by the fact that the wires or cables of very low elongation have a relative elongation of less than 0.2% measured at 10% of their rupture force.

3. The tire according to claim 2, characterized by the fact that the cables are formed of steel wires and have a cable lay of more than 12 times the apparent diameter of the cables.

4. The tire according to claim 1, characterized by the fact that the elastic wires or cables have a relative elongation greater than 0.5% measured at 10% of their rupture force.

5. The tire according to claim 1, characterized by the fact that the wires or cables of very low elongation form angles of between 55° and 60° with the longitudinal direction of the tire.

6. The tire according to claim 1, characterized by the fact that said ply of wires or cables of very low elongation which is closest to the carcass reinforcement extends into said transition zone up to a radial distance h of less than 0.4 H in the case of a tire having an H/B ratio of at least equal to 0.65, h being measured from the intersection of the carcass reinforcement with the equatorial plane in the direction towards the axis of rotation of the tire, H being the radial height of the unloaded tire mounted and inflated in accordance with the customary standards, and B being the maximum axial width of the tire as measured from one sidewall to the other.

7. The tire according to claim 1, characterized by the fact that the two plies of wires or cables of very low elongation have axial widths greater than the axial width of the tread.

8. The tire according to claim 1, characterized by the fact that the elastic wires or cables form an angle of between 8° and 12° with the longitudinal direction of the tire.

9. The tire according to claim 1, characterized by the fact that the ply of elastic wires or cables has an axial width which is between 60% and 80% of the axial width of the tread.

10. The tire according to claim 1, characterized by the fact that it comprises two plies of elastic wires or cables crossed with respect to each other, these plies having axial widths of between 60% and 80% of the axial width of the tread.

11. The wire according to claim 1 or claim 10, characterized by the fact that it comprises two plies of elastic wires or cables crossed with respect to each other, one of said plies being arranged radially to the inside and the other being arranged radially to the outside of the two plies of wires or cables of very low elongation.

12. The tire according to claim 1 or claim 10, characterized by the fact that it comprises two plies of elastic wires or cables crossed with respect to each other, said two plies being arranged radially to the outside of the two plies of wires or cables of very low elongation.

13. The tire according to claim 1, characterized by the fact that said layer of rubber increases axially in thickness in the direction away from said equatorial zone up to a value of 50% of the total thickness of the wall of the tire at the ends of the tread reinforcement.

* * * * *